Nov. 13, 1923.

C. L. TROSKY ET AL 1,473,748

METHOD OF AND MEANS FOR TESTING GEARS

Filed Sept. 8, 1919

INVENTORS.
Charles L. Trosky
Clayton C. Marsh.
BY

ATTORNEYS.

Patented Nov. 13, 1923.

1,473,748

UNITED STATES PATENT OFFICE.

CHARLES L. TROSKY AND CLAYTON C. MARSH, OF INDIANAPOLIS, INDIANA, ASSIGNORS TO ALLISON EXPERIMENTAL COMPANY, OF INDIANAPOLIS, INDIANA, A CORPORATION.

METHOD OF AND MEANS FOR TESTING GEARS.

Application filed September 8, 1919. Serial No. 322,362.

*To all whom it may concern:*

Be it known that we, CHARLES L. TROSKY and CLAYTON C. MARSH, citizens of the United States, residing at Indianapolis, in the county of Marion and State of Indiana, have invented certain new and useful Improvements in Methods of and Means for Testing Gears, of which the following is a specification.

This invention relates to testing the accuracy of gears where as near perfect alignment of gears as possible is required, especially where two or more sets of teeth are formed on a single gear blank. It is among the objects of our invention to devise a method of and means for testing the accuracy of alignment of such gear teeth in a simple and easily operated manner.

In carrying the objects of our invention into effect we provide a master testing gear having a correct alignment of teeth and we cause the gear to be tested for accuracy to be meshed with said master testing gear, and means are provided for accurately determining the amount of error in said gear. In the following specific example of our invention we have shown and described the testing of the accuracy of gears having a set of herring bone teeth and spur teeth, and the method of making which is described and claimed in our co-pending application, Serial No. 322,361, filed September 8, 1919, for improvements in gear cutting.

Figure 1:
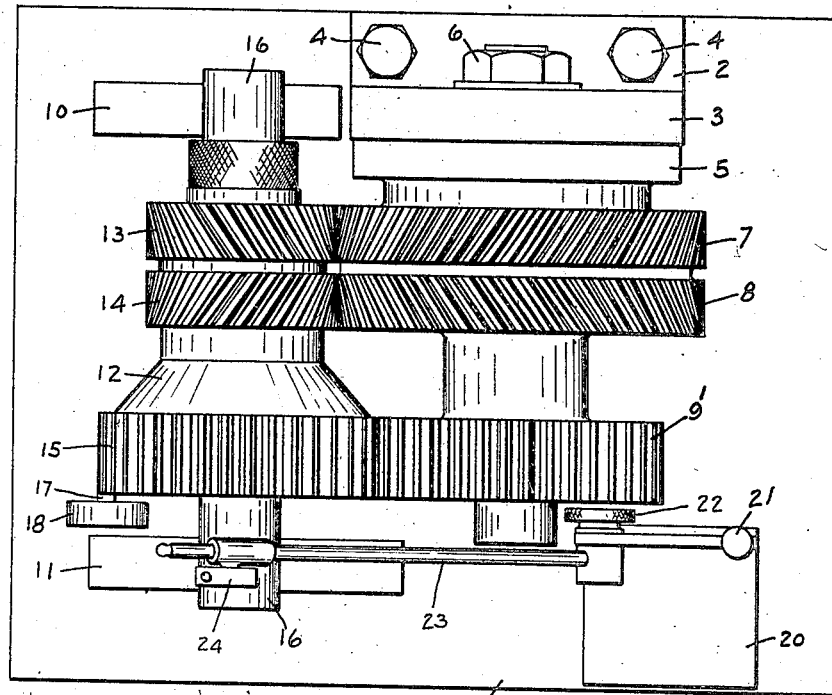
Figure 2:
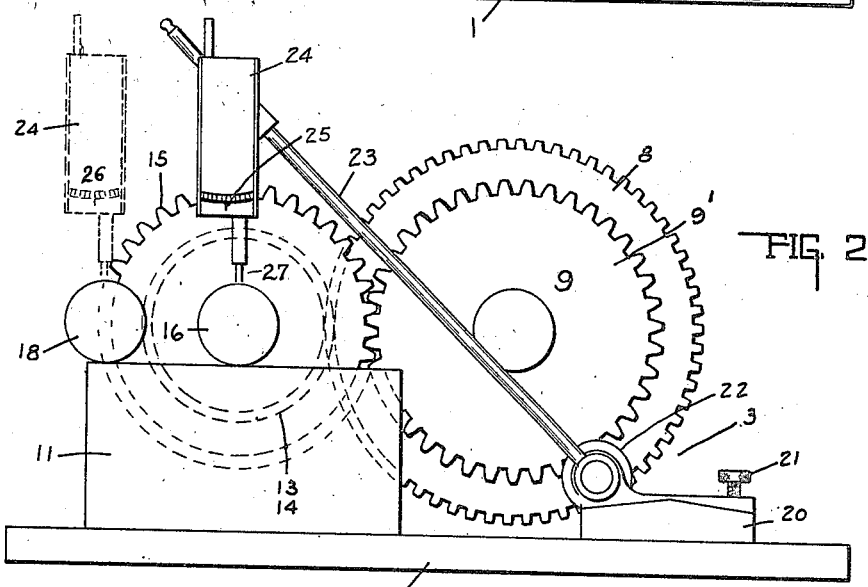

Referring to the accompanying drawings forming a part hereof and in which similar reference characters denote similar parts, Figure 1, illustrates a plan view of the testing arrangement, and Figure 2, an end view thereof.

The test table 1 is provided with a perfectly level surface upon which the device is mounted; a bracket 2 having a vertical portion 3 is fixed to the test table in any suitable manner, as by bolts 4. The master testing gear 5 is securely fixed to the vertical portion 3 of the bracket as by a bolt 6, or other suitable means and is held non-rotatable thereby. Accurately aligned spiral teeth 7 and 8 are formed thereon and also spur teeth 9' and serve as a master gear for testing the accuracy of the ordinary gear. An arbor 9 extends from the center of the master testing gear.

A set of parallel supports 10 and 11 are provided, the upper faces of said supports lying in the same plane, which plane is also tangent to arbor 9 at its under side whereby an arbor lying on said supports will be in horizontal alinement with arbor 9. An arbor 16 of the same diameter is shown as resting on said supports and carrying a gear 12 having a set of spur teeth 15 whose accuracy is to be determined, said spur teeth being adapted to engage teeth 9' on testing gear 5, and two sets of spiral teeth 13 and 14 adapted to register with the spiral teeth 7 and 8. A test pin 17 has a shank of such diameter that when placed in a tooth space of the spur 15, it will only touch the longitudinal pitch line of the tooth. The head 18 of the test pin has a diameter equal to the diameters of arbors 9 and 16.

A test gage for measuring the accuracy of alignment of the teeth is provided and has a base 20 free to slide on the test table 1, and has a two-armed lever pivoted to the base 20 at point 22 carrying the gage 24 on the arm 23, and a set screw 21 on the other to line the gage pointer to the zero mark. A screw arrangement 22 on said base is adapted to secure the arm 23 in any desired position. On the end of said arm is the gage 24 having a pointer 25 playing over a scale 26. Within the gage 24, which is of well known construction, is any suitable form of arrangement for multiplying the error measured by the gage pin 27 fixed to the lower end of the gage 24.

The process of testing is as follows:

The master testing gear is fixed in place with the bottom of its arbor in line with the top of parallel plates 10 and 11, the gear to be tested is placed with its arbor on said parallel plates and moved forward until teeth 13 and 14 mesh perfectly with teeth 7 and 8. Test pin 17 is then placed in a tooth space on the spur 15 closest to the median line joining the centers of arbors 9 and 16 and held there by a rubber band or other suitable means. The gear 15 is so formed that when the master gear and gear 15 are meshed the space in which pin 17 is placed would have its center in the plane of the axes of arbors 9 and 16 if the alignment is correct. The gage is then lifted on the test table 1 until gage pin 27 is resting on the top of the arbor 16 and the reading taken. It is usual to first adjust the gage from the arbor 9 of the master gear so that the reading at this point will be zero. The gage is then shifted until gage pin 27 rests on 16 and then on the top of head 18 of the test pin 17. A reading is then taken and the difference between the two readings indicates the amount of error. If the gage is set at zero on arbor 16, the reading when the gage is on head 18 will directly give the error.

Although we have shown and described our invention in connection with a herring bone set of teeth it is to be understood that in testing a gear having a plurality of sets of teeth it is only necessary that a master testing gear, having teeth corresponding to but one set of teeth on the gear to be tested, be provided. In practical use the height of arbor 9 is very seldom determined except at intervals to see whether it has moved out of its fixed position.

Having thus fully described our said invention, what we claim as new and desire to secure by Letters Patent, is:

1. Means for testing gears comprising a master testing gear mounted on an arbor and fixed to a test table and adapted to co-operate with a gear to be tested also mounted on an arbor, parallel plates, said second arbor resting on said parallel plates, and means co-operating with said arbors for determining the accuracy of the teeth.

2. Means for testing gears comprising a master testing gear mounted on an arbor and fixed to a test table and adapted to co-operate with a gear to be tested also mounted on an arbor, parallel plates, said second arbor resting on said parallel plates, a test pin having a shank diameter such that it will touch the pitch circle when placed longitudinally of the teeth to be tested and having a head whose diameter is equal to the diameter of the arbor of the gear to be tested, and a height gage to determine the accuracy of the alignment of the teeth.

3. Means for testing gears comprising a master testing gear mounted on an arbor and fixed to a test table and adapted to co-operate with a gear to be tested also mounted on an arbor, parallel plates, said second arbor resting on said parallel plates, a test pin having a shank diameter such that it will touch the pitch circle when placed longitudinally of the teeth to be tested, and a head having a diameter equal to the diameter of the arbors of the gear to be tested and the master testing gear and a height gage to determine the accuracy of alignment of the teeth.

4. A method of testing the alignment of teeth in gear wheels having plural sets of teeth comprising arranging a gear wheel to be tested and a master gear wheel on arbors with their axes in the same plane and with teeth of one set on each gear wheel fully engaged, locating a testing pin on the first gear wheel between those teeth of another set lying the nearest to said plane, the body of said pin engaging each tooth at the pitch line, and the head being equal in diameter to said arbors, and determining the distance between said plane and the axis of said pin.

In witness whereof, we have hereunto set our hands and seals at Indianapolis, Indiana, this 4th day of September, A. D. nineteen hundred and nineteen.

CHARLES L. TROSKY. [L. s.]
CLAYTON C. MARSH. [L. s.]

Witnesses:
H. C. BIERMAN,
M. L. SHULER.